June 17, 1941.    P. J. BERGGREN    2,245,563
PHOTOGRAPHIC LIGHT CONTROLLING ELEMENT
Filed Oct. 6, 1937
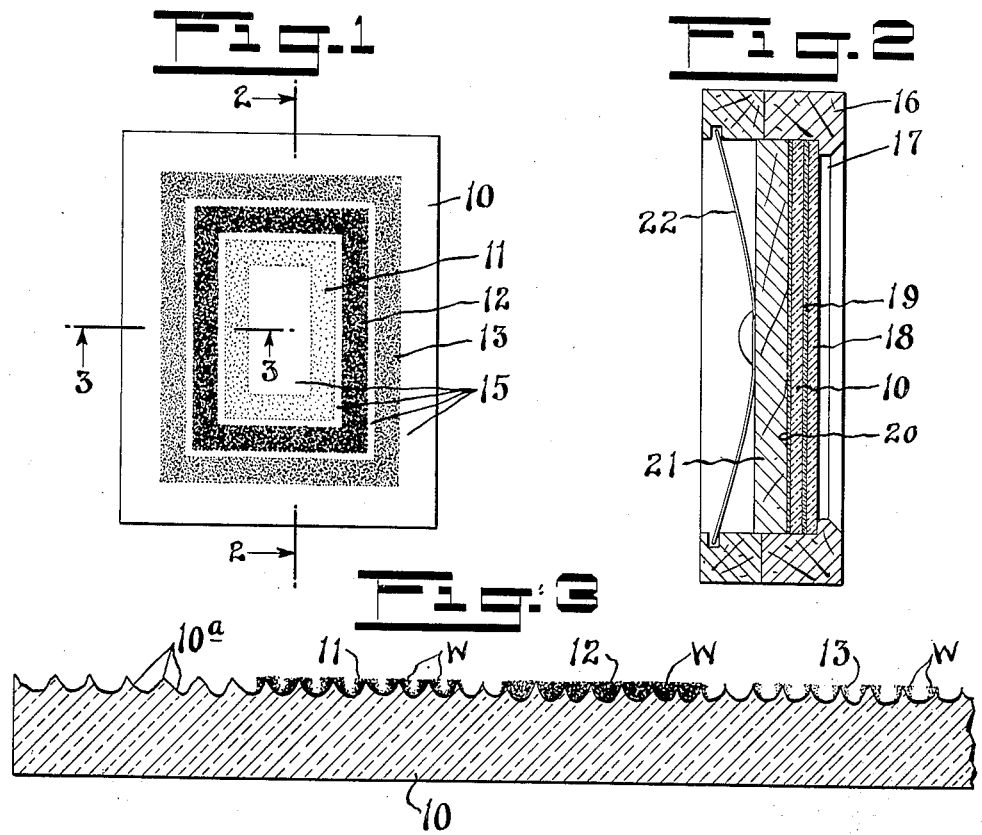
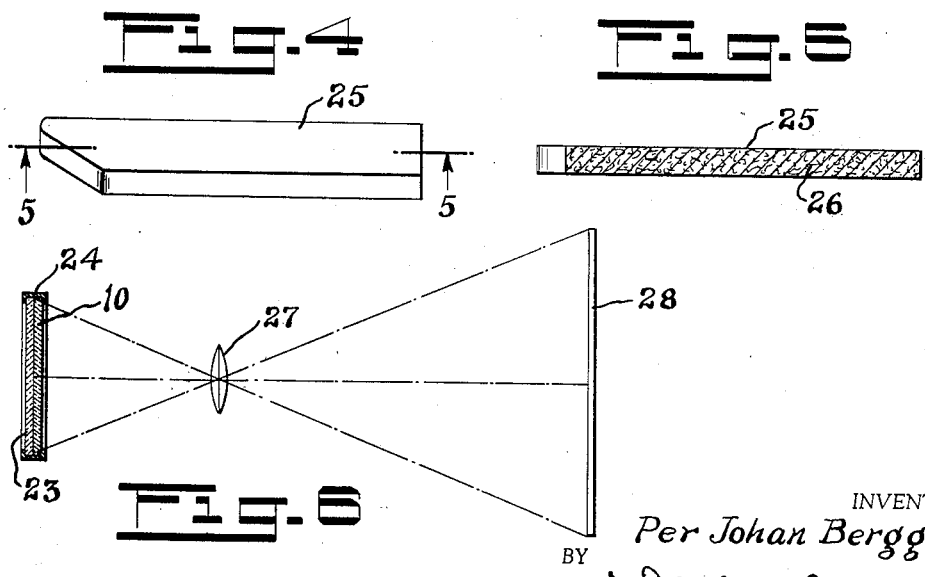
INVENTOR.
Per Johan Berggren
BY Darby Darby
ATTORNEYS Patented June 17, 1941

2,245,563

UNITED STATES PATENT OFFICE 2,245,563

PHOTOGRAPHIC LIGHT CONTROLLING ELEMENT

Per Johan Berggren, New York, N. Y.

Application October 6, 1937, Serial No. 167,538

3 Claims. (Cl. 95—101)

This invention relates to improvements in light controlling element such as are employed in the reproduction of photographic prints from negative films.

An object of this invention is the provision of a light controlling element of this type.

These and many other objects, as will be apparent from the following specification, are successfully secured by means of the invention herein disclosed.

This invention resides substantially in the combination, construction, relative arrangement of parts, steps and series of steps, all in accordance with the description herein.

In the accompanying drawing, in which the principles of this invention have been illustrated diagrammatically, Fig. 1 is a front elevational view of a light controlling element in accordance with this invention indicating the variations in transparency of the light controlling element on defined areas;

Fig. 2 is a transverse, cross-sectional view through a contact printing frame employing the light controlling element of this invention on a line such as the line 2—2 of Fig. 1;

Fig. 3 is an enlarged cross-sectional view through a portion of the light controlling element of Fig. 1 on the line 3—3 thereof;

Fig. 4 is a perspective view of a crayon or pencil composed in accordance with this invention, of materials by means of which the light controlling element of Fig. 1 may be produced;

Fig. 5 is a cross-sectional view taken on the line 5—5 of Fig. 4; and

Fig. 6 is a diagrammatic view with some portions in cross-section of a projection printer employing the light controlling element of this invention.

As is well known in the photographic arts, it is often desirable to produce positive prints from negative film through a diffusing element, first for the purpose of softening or diminishing the harsh lines, and the sharp or strong lines or portions thereof, and second to prevent the reproduction on the positive of the retoucher's marks on the negative. For example, in the case of a portrait, the negative film frequently shows harsh lines or wrinkles in the face, which it is desired to eliminate in the prints therefrom. This is frequently done by placing a diffusing element over the sensitized positive film and exposing it to the negative film therethrough. The same sort of diffusing element is employed when it is desired to prevent the reproduction in the positive print of the retoucher's lines applied to the negative film. It is of course well known in the art that the retoucher's lines are the result of the marking out on the negative of undesired lines such as wrinkles, skin blemishes and other defects in the skin of the subject.

At the present time there are two generally known methods of modifying such elements. In the one a clear sheet of transparent material such as glass which is placed over the negative film, has brushed thereon or otherwise applied thereto, in any suitable manner, as for example by means of a brush, a diffusing film of some suitable material such for example as a fat, an oil, a wax, a soap, or the like. This diffusing or translucent film is painted onto the glass over the areas to be diffused, which in the case of a portrait would be the skin of the face. This leaves the glass clear and transparent at the eyes, the mouth, the nose, and such other points as are desired.

The difficulty with this method is that, as will be apparent, very sharp lines of division occur between the transparent and the diffusing or translucent areas, which produce highly undesired effects in the positive print taken therethrough. It would be highly desirable if a way were known to effect a softening of the division line between the transparent and the translucent areas, and it would be highly desirable to be able to effect a gradation or shading in the translucent areas. This is not possible by use of the film materials of the type explained above and now known.

A second method which is sometimes employed for modifying diffusing elements of this type consists in applying over the negative a ground glass or film and then applying thereto an oil, a fat, or a wax at desired areas to render it transparent. For example, the areas over the eyes, the mouth and the nose are painted in or filmed with a fat, a wax or the like, which renders these areas transparent, leaving the rest of the plate or film translucent because of its ground surface. Here again it is not possible to effect a gradual or shaded line of distinction between the translucent and the transparent areas. The line of demarkation is sharp, which is undesirable for many obvious reasons. Furthermore, all materials heretofore known for the purpose of rendering ground glass plates or films transparent easily smudge and smear, making it extremely difficult to handle the element during the reprinting operations. Furthermore, these materials used to render the ground glass plate or film transparent are hard to handle and apply and require highly skilled technicians in their use.

In either case of the known art it is extremely difficult to correct any errors which the operator may make in the production of the element so that frequently it is necessary when an error is made to apply a new plate over the negative and start all over again.

The full nature of this invention will now be set forth by means of a detailed description thereof in connection with the attached drawing.

In Fig. 1 there is shown a ground glass plate or film 10. Such plates and films are well known in the art and are commercially available. This plate is placed over a developed negative film which is to be printed. Let it be assumed that the scene on this negative consists of three concentric rectangles all of the same density. Let it be further assumed that it is desired, in producing the positive print to reproduce these rectangles of different density. In order to accomplish this there is applied to the ground surface of the plate or film on areas directly over the rectangle in the negative, a material which comprises a part of this invention, by means of which these areas may be rendered more transparent. The material which, as will be explained below, is preferably prepared in crayon or pencil form, is worked into these areas by hand in the desired quantities or densities to give the desired variations of density in the finished print. For example the innermost rectangle 11 has been indicated as having applied thereto a relatively small amount of the material, the rectangle 12 is indicated as having applied thereto a relatively larger amount of the material, while the rectangle 13 is shown as having applied thereto a medium amount of the material. The areas 15 have had none of the material applied thereto, with the result that the plate is the least transparent at these areas. It is somewhat more transparent at the area 11, most transparent at the area 12, and transparent in an intermediate amount at the area 13. Thus as between desired areas it is apparent that various transparencies may be secured, and it should be noted that even within these areas the transparency may be varied. This illustrates a feature of the invention that is of great importance. By means of the use of this material in accordance with this invention the line of demarkation between the translucent and the more transparent areas may be substantially eliminated by shading, that is by variation in the amount of the material applied to the areas to be rendered more transparent. Thus, in the case of the preparation of a light controlling element for use in the reproduction of a portrait, the areas of the eyes, nose and mouth, while they are made transparent, may be made transparent in varying degrees, especially towards the outer edges thereof, so that the change over to the totally transparent portion of the mask is graduated.

By means of this invention a further tool is supplied to the artistic printer. In printing for example a portrait from a negative, a decorative frame can be created in the positive print, as for example by the method illustrated in Fig. 1. This is but illustrative of a wide field of artistic freedom which the invention permits. For example, in a countryside scene it is possible, by means of this method, to introduce clouds, to soften up, diminish or hold back undesired or background objects, clouds and the like. This is all possible by reason of the fact that the transparency of the ground glass or film can be varied or graduated as distinguished from known methods where the film areas become fully transparent, so that the light controlling element consists of two sets of areas, one translucent and the other fully transparent.

Fig. 3 has been supplied to indicate what is believed to be the manner in which the filming material acts to produce gradations in the transparency of the translucent plate or film. As is shown at $10^a$, the ground face is roughened by reason of the presence of minute pits. The material which is applied to this roughened surface to render it variously transparent is shown at W. Thus at 13 only a small amount of this material is applied giving the least transparent treated area. At 12 the greatest amount of this material is applied substantially filling the pits up flush giving the greatest transparency. At 11 a medium amount of this material has been applied, giving a medium amount of transparency. The variations in the quantity of material applied is secured by the number of times which the crayon or pencil of the material is rubbed over the area, and the pressure with which it is applied. Thus merely by manual manipulation in a manner quite similar to the way in which an artist makes a charcoal sketch, the material is applied to effect the application of various quantities thereof.

A description will now be given of the material and how it is prepared. As explained above, prior to this invention there was no known material for filming clear glass plates or film by rendering ground glass plates or films translucent which would permit of a variation in the light transmitting qualities thereof. Furthermore, it was explained above how such materials as are used for this purpose readily smear and smudge and are hard to apply. The material of this invention may be made in stick or pencil form as distinguished from the liquid forms of the materials commonly used, and may be easily applied. A very important characteristic of this material is that it does not smudge and smear, and will remain on the plate or film for long periods of time without deterioration or destruction, even though it is extensively handled.

Furthermore, this material may be readily removed from the plate when so desired by the use of, among other things, a hydrocarbon solvent such as carbon tetrachloride. It can also be removed wholly or in part by an ordinary rubber eraser.

This material consists principally of two basic substances which are combined in accordance with the following disclosure, namely carnauba wax and stearic acid. Either of these substances alone to a very uncertain degree will produce the desired effect, but each of them separately have particular defects which make them impractical for the purposes of this invention. The carnauba wax is very hard and requires a lot of effort and hard pressure to work it into the cavities of the ground glass or film. It is also very brittle and chips and breaks easily when worked under pressure. When once applied it is hard to remove and shade. The stearic acid works easier but is inclined to smudge and smear and does not produce a clean and clear transparency. The result is somewhat like strays in glass and will impair a true optical reproduction of the negative when present. However, several suitable combinations of these two basic materials can be combined which do not have these defects. I have found that very desirable results are secured from the following combination, such as producing a smooth, clean and clear transparency, free from the tendency to smudge and smear, applicable with a minimum of pressure and effort to the ground surface, and which can be easily removed and shaded. This combination comprises, for example, five parts by weight of carnauba wax and one part by weight of triple pressed stearic acid, melted and mixed and to each ounce of this mixture ninety drops of any suitable vegetable oil such as olive oil are added and mixed therein. There may then be added to the mixture, if desired, a suitable transparent dye or pigment, preferably an oil soluble dye, or one soluble in a hydrocarbon. The amount of dye or pigment added is not critical but may be varied, depending upon the various transparencies desired. In other words, in addition to the ability for effecting transparency graduations in accordance with the illustration in Fig. 3, further variation may be accomplished by the coloring of the material itself, thereby varying its own light transmitting characteristics.

The amount of vegetable oil used may be raised depending upon the oil content of the stearic acid. Therefore the amount used will vary depending upon the ability of the mixture to absorb it. The controlling factors as to the amount of oil used are that the final combination should give clean partial or complete transparency without too much pressure in application and without leaving an excess of material on the ground surface.

This melted mixture is then poured onto a thin sheet or body of fibrous material such as cotton, which has preferably been placed in a mould. It is desirable that the mould be warm so that the material thoroughly impregnate the cotton fibres before it is chilled. If desired a glass or other smooth plate may be placed down on the warm wax to hold the mass into a thin sheet until it has hardened. The sheet is then cut into sticks which are placed in a mould of the desired size, as for example one having a cavity $\frac{3}{32}$ of an inch to $\frac{3}{16}$ of an inch, and of any desired length. The mould is then placed in an oven so that the wax softens and assumes the form of the mould. It is removed therefrom and then cut into suitable lengths, as for example lengths of one and one-half inches. This provides a wax crayon or pencil having embodied therein a mass of fibers which are employed to give the crayon greater physical strength. It has been found that their presence does not interfere with the application of the wax to the ground glass since the short ends of the fibers as they wear off disappear. Such a crayon or pencil is shown at 25, one end of which has been beveled off to give a working point. At 26 in the cross sectional view have been indicated the fibers which are embedded in the wax and strengthen the stick. Such a crayon can be used in the hand or in a suitable holder therefor. The sharpened end is worked over the areas of the ground glass plate or film to fill in the roughened surface in the manner explained above.

A light controlling element made in accordance with this invention can be used either in the contact or the projection type of printer. In Fig. 2 there has been illustrated its use in contact printing employing a negative film. The usual form of printing frame is shown at 16 having the light aperture 17. Set in the frame is a glass backing or cover plate 18. Resting against this plate is the negative film 19 which is to be printed. Superimposed on this film is the light controlling element 10 of this invention. It is of course to be remembered that in each case the mask is prepared by application over the negative film and the various areas treated with the crayon to get the desired effects. Against the light controlling element is placed the sensitized paper, plate or film 20, onto which the negative is to be reproduced. Superimposed upon all of these plates is the back wall 21 of the printing frame which has mounted thereon the usual spring which engages in the frame to clamp the parts together. With the parts thus assembled the frame is exposed to the necessary light through the aperture 17 to effect exposure of the positive film through the negative film of the light controlling element.

There is illustrated in Fig. 6 the projection method of printing employing the film of this invention. In this case the developed negative is of the glass plate type, as shown at 23. Superimposed thereon is the ground glass plate or film 10. These two plates are bound together by means of adhesive tape 24 around the edges thereof. The ground surface of the plate 10 has of course at its various areas been treated to get the desired transparency in accordance with the procedure explained above. It is then placed in a projection printer between the light source and the objective lens 27. The light passing through the lens 27 is focused upon the printing plane in which lies the sensitized positive film 28. Thus the negative is reproduced through the light controlling elements to produce the desired result.

From the above description it will be apparent to those skilled in the art that the principles of this invention, the methods of procedure, and the structures employed may be widely varied without departure from the scope thereof. Those skilled in the art will readily appreciate the wide field of use of the light controlling elements of this invention, subject as it is to the experience and artistic abilities of the photographer and printer. I do not, therefore, desire to be strictly limited to the disclosure as given for purposes of illustration, but rather to the scope of the claims granted me.

What I seek to secure by United States Letters Patent is:

1. A photographic light controlling printing element through which a negative is to be exposed onto a sensitized surface for printing comprising a thin sheet of basically transparent material having a finely and evenly ground surface and a readily removable smudge-proof translucent wax-like material applied on the ground surface, at the desired areas thereof through which light is transmitted to the image areas of the negative, in desired graduated quantities to render the ground surface light transmitting in desired degrees.

2. A photographic light controlling printing element through which a negative is to be exposed onto a sensitized surface for printing comprising a thin sheet of basically transparent material having a finely and evenly ground surface and a readily removable smudge-proof translucent material composed substantially of carnauba wax and stearic acid applied on the ground surface, at the desired areas thereof through which light is transmitted to the image areas of the negative, in desired graduated quantities to render the ground surface light transmitting in desired degrees.

3. A photographic light controlling printing element through which a negative is to be exposed onto a sensitized surface for printing comprising a thin sheet of glass having a finely and evenly ground surface and a readily removable smudge-proof translucent wax-like material applied on the ground surface, at the desired areas thereof through which light is transmitted to the image areas of the negative, in desired graduated quantities to render the ground surface light transmitting in desired degrees.

PER JOHAN BERGGREN.